US011204363B2

United States Patent
Fujii et al.

(10) Patent No.: US 11,204,363 B2
(45) Date of Patent: Dec. 21, 2021

(54) DEVICE FOR DETECTING LEADING END OF PIPETTE TIP, AND STORAGE MEDIUM STORING PROGRAM FOR DETECTING LEADING END OF PIPETTE TIP

(71) Applicant: KONICA MINOLTA, INC., Tokyo (JP)

(72) Inventors: Hiromi Fujii, Kyoto (JP); Atsushi Hosotani, Kyoto (JP); Yasuhiro Miyake, Kyoto (JP); Takefumi Asou, Kyoto (JP); Tetsuya Noda, Hino (JP); Atsuo Iwashita, Machida (JP); Yuuya Shouji, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 286 days.

(21) Appl. No.: 16/491,381

(22) PCT Filed: Mar. 2, 2018

(86) PCT No.: PCT/JP2018/008108
§ 371 (c)(1),
(2) Date: Sep. 5, 2019

(87) PCT Pub. No.: WO2018/164006
PCT Pub. Date: Sep. 13, 2018

(65) Prior Publication Data
US 2020/0025784 A1  Jan. 23, 2020

(30) Foreign Application Priority Data
Mar. 6, 2017 (JP) .............................. JP2017-041367

(51) Int. Cl.
*G01N 35/10* (2006.01)
*B01L 3/02* (2006.01)

(52) U.S. Cl.
CPC .......... *G01N 35/1011* (2013.01); *B01L 3/021* (2013.01); *G01N 35/1016* (2013.01); *B01L 2200/146* (2013.01)

(58) Field of Classification Search
CPC ............... B01L 3/021; B01L 2200/146; G01N 35/1016; G01N 35/1011
See application file for complete search history.

(56) References Cited

U.S. PATENT DOCUMENTS

| 5,143,849 A | 9/1992 | Barry et al. |
| 2013/0081719 A1 | 4/2013 | Kuwae |

(Continued)

FOREIGN PATENT DOCUMENTS

| EP | 3260869 A1 | 12/2017 |
| WO | 2016132793 A1 | 8/2016 |

OTHER PUBLICATIONS

International Preliminary Report on Patentability corresponding to Application No. PCT/JP2018/008108; dated Sep. 10, 2019.

(Continued)

*Primary Examiner* — Shogo Sasaki
(74) *Attorney, Agent, or Firm* — Cantor Colburn LLP

(57) ABSTRACT

A pipette tip leading end detection device for detecting that a leading end of a pipette tip is close to a reference surface set to a reaction vessel includes a pipette nozzle, pump, nozzle driver, pressure sensor that detects a pressure generated between the pipette tip and pump, and hardware processor. The hardware processor obtains a determination value using an AD conversion value obtained from the pressure while the pipette nozzle is being lowered, and detects that the leading end of the pipette tip is close to the reference surface on the basis that the determination value is a threshold value or more. The determination value is a calculation value indicating a pressure change speed calculated from AD conversion values within a past certain time (Continued)

and the threshold value is a value larger than maximum noise.

2 Claims, 8 Drawing Sheets

(56) References Cited

U.S. PATENT DOCUMENTS

2015/0316532 A1\* 11/2015 Makino .............. G01N 35/1002
 422/64
2016/0258972 A1\* 9/2016 Zordan ................... B01L 3/021
2018/0074043 A1\* 3/2018 Makino .............. G01N 33/4905

OTHER PUBLICATIONS

Extended European Search Report for corresponding EP Application No. 18764043.8; dated Feb. 21, 2020.
International Search Report corresponding to Application No. PCT/JP2018/008108; dated Jun. 5, 2018.

\* cited by examiner

DEVICE FOR DETECTING LEADING END OF PIPETTE TIP, AND STORAGE MEDIUM STORING PROGRAM FOR DETECTING LEADING END OF PIPETTE TIP

CROSS REFERENCE TO RELATED APPLICATIONS

This is the U.S. national stage of application No. PCT/JP2018/008108, filed on Mar. 2, 2018. Priority under 35 U.S.C. § 119(a) and 35 U.S.C. § 365(b) is claimed from Japanese Application No. 2017-041367, filed Mar. 6, 2017; the disclosures of which are incorporated herein by reference.

TECHNICAL FIELD

The present invention relates to a device for detecting the leading end position of a pipette tip by bringing a pipette tip attached to the leading end of a pipette nozzle and used for sucking or discharging liquid close to a reference surface set to a reaction vessel having an accommodation part capable of accommodating the liquid, and a pipette tip leading end detection program.

BACKGROUND ART

In an analyzer for analyzing a sample using a reaction vessel including an accommodation part capable of accommodating liquid and a pipette nozzle whose leading end a pipette tip for discharging or sucking the liquid into/from the accommodation part is attached to, in a reaction step (for example, an immunological agglutination reaction step) including a step of sucking, from the leading end of the pipette tip, and removing the liquid in the accommodation part, it is required to minimize a liquid remaining quantity in the accommodation part and keep the remaining quality constant in the course of removing the liquid, from a viewpoint of improving the accuracy of detection results and stabilizing reaction efficiency. Therefore, it is necessary to adjust the leading position of the pipette tip with respect to a bottom surface of the accommodation part with high accuracy.

A conventional technique is known that brings the pipette nozzle close to the surface of liquid (liquid surface) while air is being discharged from the leading end of the pipette tip in the state in which the liquid is sent into the accommodation part, detects contact of the leading end of the pipette tip to the liquid surface on the basis of a pressure change that changes significantly when the leading end of the pipette tip contacts with the liquid surface, and stops lowering operation of the pipette nozzle at that time point.

In the aspect of detecting the leading end position of the pipette tip by contacting the leading end of the pipette tip to the liquid surface, however, there is a risk of contamination in which the liquid attaches to the pipette tip.

A technique is also known that brings the pipette nozzle close to a surface serving as a reference (for example, the bottom surface of the accommodation part) while air is being discharged from the leading end of the pipette tip before the liquid is sent into the accommodation part, detects contact of the leading end of the pipette tip to the surface serving as the reference on the basis of a pressure change that changes significantly when the leading end of the pipette tip contacts with the surface serving as the reference, and stops lowering operation of the pipette nozzle at that time point.

In the aspect of detecting the leading end position of the pipette tip by contacting the leading end of the pipette tip to the surface serving as the reference, however, a contamination problem arises in the same manner as the aspect of detecting the leading end position of the pipette tip by contacting the leading end of the pipette tip to the liquid surface. In addition, when the leading end of the pipette tip is contacted to the surface serving as the reference, the leading end of the pipette tip may be damaged or the surface serving as the reference may be damaged. Especially, when the surface serving as the reference is a reaction solid phase, if an antibody or the like coated on the reaction solid phase is damaged by contact with the leading end of the pipette tip, reaction efficiency in the reaction step may be reduced.

With respect to such a reference surface, i.e. a reaction solid phase not desired to be contacted or damaged or the like, if a technique can be realized that detects by air pressure detection that the leading end of the pipette tip is in an extreme proximity state within a range in which the leading end of the pipette tip does not contact, its technical value is extremely high.

One company of the applicants of the present invention proposed in advance a detection method including a first step of measuring a first pressure in a pipette tip when gas is sucked or discharged from the leading end of the pipette tip in the state in which the leading end of the pipette tip is away from a predetermined reference part (as an example, the bottom surface of an accommodation part), a second step of measuring a second pressure in the pipette tip when gas is sucked or discharged from the leading end of the pipette tip in the state in which the leading end of the pipette tip is brought closer to the reference part than the first step, and a third step of detecting the leading end position of the pipette tip with respect to the reference part on the basis of a difference between the first pressure measured in the first step and the second pressure measured in the second step after the first step and second step (Patent Literature 1).

Patent Literature 1 exemplifies as a specific example an aspect that obtains the difference between the first pressure and second pressure by subtracting the second pressure from the first pressure, repeats the following steps until the difference between the first pressure and second pressure is equal to or greater than a predetermined threshold value: moving the leading end of the pipette tip towards the bottom surface of the accommodation part, i.e. the reference part and measuring the second pressure in the pipette tip by a pneumatic sensor while air is being discharged from the leading end of the pipette tip, determines that the leading end of the pipette tip is close to the bottom surface of the accommodation part, i.e. the reference part on the basis of occurrence of the difference between the first pressure and second pressure, and thereby detects the leading end position of the pipette tip with respect to the reference part.

CITATION LIST

Patent Literature

Patent Literature 1
International Publication No. WO 2016/132793

SUMMARY OF INVENTION

Technical Problem

The detection method described in Patent Literature 1 does not give any consideration at all to pneumatic or electric noise which occurs in pressure signals of the measured first pressure and second pressure.

Therefore, if noise occurs in the pressure signal of the second pressure in the pipette tip measured while air is being discharged from the leading end of the pipette tip, the pressure difference between the first pressure and second pressure significantly changes, and due to the occurrence of such pressure change, there is a possibility that it may be determined that the leading end of the pipette tip is close to the bottom surface of the accommodation part, i.e. the reference part, and the leading end position of the pipette tip with respect to the reference part may be detected. As noise may occur irregularly, timing at which the pressure change due to the noise appears as the pressure difference between the first pressure and second pressure is not constant either, and there is a risk of erroneous determination of determining that the leading end of the pipette tip has come close to the bottom surface of the accommodation part, i.e. the reference part at a time point when the leading end of the pipette tip is at a position farther from the bottom surface of the accommodation part than a position (position at which the leading end of the pipette tip should be stopped during liquid removing processing) where the liquid remaining quantity in the accommodation part is minimum in the liquid removing step.

Especially, the detection method described in Patent Literature 1 sets as the second pressure the pressure in the pipette tip measured when gas is sucked or discharged from the leading end of the pipette tip in the state where the leading end of the pipette tip is brought close to the bottom surface of the accommodation part. Therefore, this second pressure is a value only indicating a pressure at the time of latest measurement, and the pressure that has significantly changed due to noise is measured as the second pressure even at the time point when the leading end of the pipette tip is at a position farther from the bottom surface of the accommodation part than the position where the leading end of the pipette tip should stop during the liquid removing processing, thereby erroneously determining that the leading end of the pipette tip has come close to the bottom surface of the accommodation part, i.e. the reference part.

The present invention has been made focusing on such points, and its main object is to provide a pipette tip leading end detection device and pipette tip leading end detection program that can detect a state in which the leading end of a pipette tip is extremely close to but not in contact with a reference surface with accuracy by removing an impact of noise without causing the leading end of the pipette tip to collide or contact with the reference surface of a reaction vessel.

Solution to Problem

That is, the present invention relates to a pipette tip leading end detection device that detects that the leading end of a pipette tip attached to a pipette nozzle and sucking or discharging liquid is close to a reference surface set to a reaction vessel having an accommodation part capable of accommodating the liquid. The reaction vessel in the present invention includes everything to have an accommodation part capable of accommodating liquid to be sucked or discharged through the leading end of the pipette tip. Therefore, the shape, material, and the like of the accommodation part are not particularly limited, and a minute depression called a well or a flow path (liquid flow path) through which liquid flows can be mentioned as an example of the accommodation part.

A pipette tip leading end detection device according to the present invention includes a pipette nozzle with a pipette tip attached thereto, a pump connected to the pipette nozzle, a nozzle driver that moves the pipette nozzle up and down, a pressure sensor that detects a pipette tip-pump pressure as a pressure generated between the pipette tip and the pump, and a control unit that controls operations of at least the pump and the nozzle driver, wherein one having a determination value calculation unit and a leading end detection unit is applied as the control unit. Here, the pipette tip-pump pressure generated between the pipette tip and the pump is synonymous with a pressure in a flow path (flow path extending from the leading end of the pipette tip into the pump) generated by the discharge and suction of the pump.

The determination value calculation unit obtains a determination value using an AD conversion value which is a value obtained by A/D converting the pipette tip-pump pressure detected by the pressure sensor while the pipette nozzle is being lowered towards the bottom surface of the accommodation part as the reference surface by the nozzle driver in the state of air being discharged or sucked from the leading end of the pipette tip by the pump. The leading end detection unit detects that the leading end of the pipette tip is close to but not in contact with the bottom surface of the accommodation part as the reference surface on the basis that the determination value obtained by the determination value calculation unit has become equal to or greater than the preset threshold value.

The pipette tip leading end detection device according to the present invention is characterized in that the determination value is a calculation value indicating the speed of a change in the pressure calculated by using a plurality of AD conversion values within a past certain time including a latest AD conversion value among AD conversion values of the pipette tip-pump pressure detected every certain time or consecutively, and the threshold value is a value larger than the maximum value of noise included in the determination value (calculation value indicating the speed of a change in the pressure) which occurs in the course of moving the leading end of the pipette tip towards the bottom surface of the accommodation part.

According to the pipette tip leading end detection device according to the present invention like this, because the threshold value compared with the determination value by the leading end detection unit is set to a value larger than the maximum value of the noise included in the determination value which occurs in the course of moving the leading end of the pipette tip towards the bottom surface of the accommodation part, in the course of moving the leading end of the pipette tip towards the bottom surface of the accommodation part, an impact of pneumatic or electric noise included in the determination value can be removed, a situation of erroneously detecting being in a proximity state in the state where the leading end of the pipette tip has not reached the targeted proximity state with respect to the bottom surface of the accommodation part can be avoided, and it is possible to detect a state in which the leading end of the pipette tip is brought as close as possible to the bottom surface of the accommodation part within a range of not affecting the supply and discharge of the liquid through the leading end of the pipette tip.

Especially, in the pipette tip leading end detection device according to the present invention, the determination value calculation unit is configured to obtain as the determination value a calculation value indicating the speed of a change in the pressure calculated using a plurality of AD conversion values within the past certain time including the latest AD conversion value among AD conversion values of the pipette tip-pump pressure detected every certain time or consecutively. Therefore, even if an AD conversion value of the pipette tip-pump pressure fluctuates significantly due to noise, the present invention can average the AD conversion value at that time point with a plurality of AD conversion values of the pipette tip-pump pressure in the past including that time point. Because the leading end detection unit compares such a determination value (determination value in which the speed of a change of the pipette tip-pump pressure within the past certain time including the latest measurement time of the pipette tip-pump pressure is reflected) with the threshold value, in comparison with the aspect of comparing the determination value in which only the latest AD conversion value of the pipette tip-pump pressure is reflected with the threshold value, it is possible to detect with high accuracy the leading end of the pipette tip that is brought close to the targeted proximity position with respect to the bottom surface of the accommodation part, and avoid the situation of erroneously determining "being in proximity" in the state where the leading end of the pipette tip is not brought close to the targeted proximity position with respect to the bottom surface of the accommodation part.

The present invention relates to a program that causes a computer to detect the leading end of the pipette tip that is close to the reference surface. That is, a pipette tip leading end detection program according to the present invention is a program that causes a computer to perform a determination value calculation step and a leading end detection step.

The determination value calculation step is a step of detecting a pipette tip-pump pressure generated between a pump connected with a pipette nozzle and the pipette tip by a pressure sensor while the pipette nozzle with the pipette tip sucking or discharging liquid attached thereto is being lowered towards a bottom surface of an accommodation part of a reaction vessel having the accommodation part capable of accommodating the liquid in a state of air being discharged or sucked from the leading end of the pipette tip, and obtaining a determination value using an AD conversion value which is a value obtained by A/D converting the detected pipette tip-pump pressure.

The leading end detection step is a step of detecting that the leading end of the pipette tip is close to the bottom surface of the accommodation part as the reference surface on the basis that the determination value obtained in the determination value calculation step is equal to or greater than a preset threshold value.

The determination value obtained in the determination value calculation step is a calculation value indicating the speed of a change in the pressure calculated by using a plurality of AD conversion values within a past certain time including a latest AD conversion value among AD conversion values of the pipette tip-pump pressure detected every certain time or consecutively. The threshold value compared with the determination value in the leading end detection step is a value larger than the maximum value of noise included in the determination value which occurs in the course of moving the leading end of the pipette tip towards the bottom surface of the accommodation part.

According to the pipette tip leading end detection program according to the present invention like this, substantially the same function and effect as the pipette tip leading end detection device according to the present invention can be obtained. That is, according to the pipette tip leading end detection program according to the present invention like this, at the leading end detection step, it is possible to eliminate trouble with receiving an impact of noise which occurs as the determination value in the course of moving the leading end of the pipette tip towards the bottom surface of the accommodation part, and detect the state in which the leading end of the pipette tip is brought as close as possible to the bottom surface of the accommodation part within a range that does not affect supply and discharge processing of the liquid through the leading end of the pipette tip.

Advantageous Effects of Invention

According to the present invention, it is possible to provide a pipette tip leading end detection device and a pipette tip leading end detection program that can detect the state where the leading end of a pipette tip is in a position extremely close to but not in contact with a reference surface with accuracy removing an impact of pneumatic or electric noise of a pressure signal without causing the leading end of the pipette tip to collide or contact with the reference surface of the reaction vessel, prevent the occurrence of contamination, and can perform stable pipette leading end detection processing without causing damage to a reaction solid phase, i.e. the reference surface. If a pipette nozzle is driven on the basis of information acquired by the detection processing by the pipette tip leading end detection device and pipette tip leading end detection program according to the present invention when performing processing performed in the state where the pipette tip is brought extremely close to the bottom surface of the accommodation part, the leading end position of the pipette tip can be controlled with high accuracy, and the situation where the leading end of the pipette tip contacts with the bottom surface of the accommodation part can be avoided, and processing such as minimizing the liquid remaining quantity in the accommodation part can be accurately performed by, for example, removing the liquid in the accommodation part through the leading end of the pipette tip.

DESCRIPTION OF EMBODIMENT

Hereinafter, one embodiment of the present invention will be described with reference to the drawings.

Figure 1:
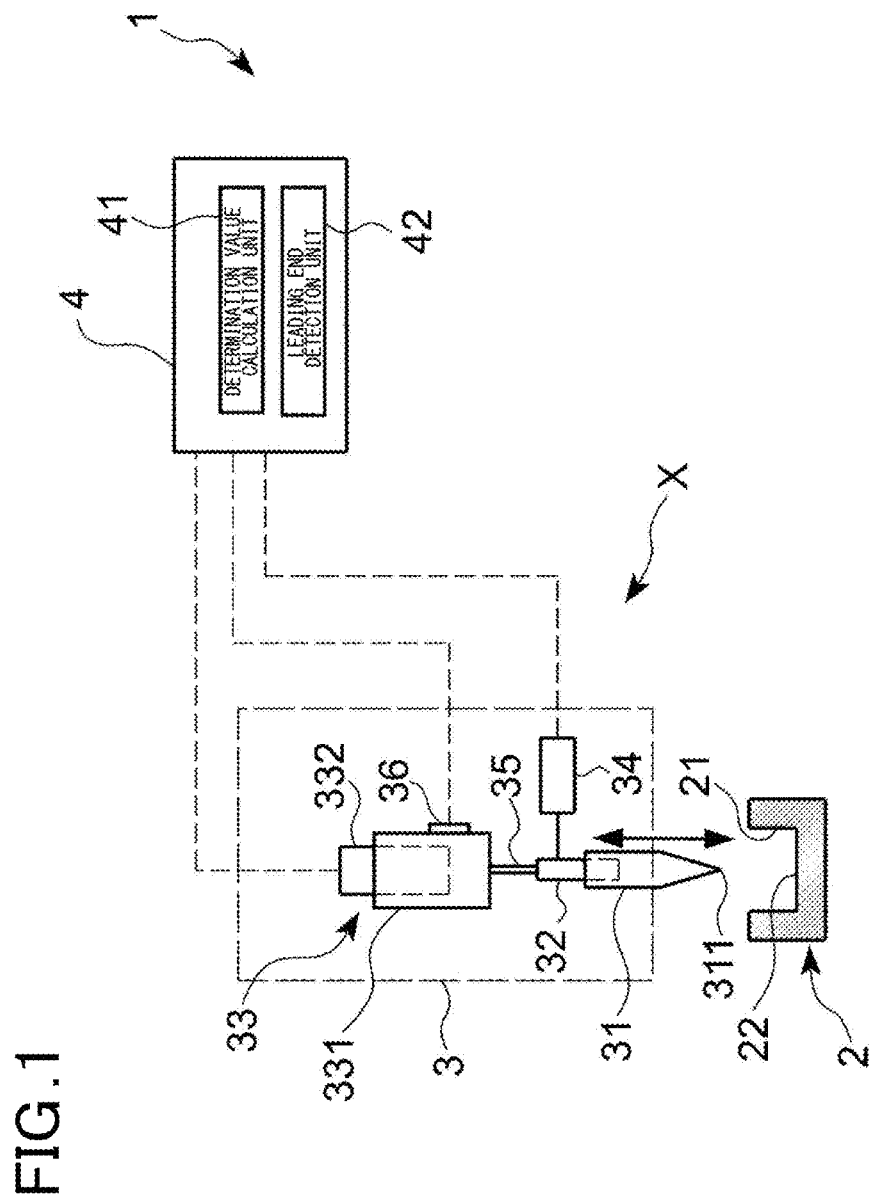
FIG. 1 is a diagram schematically showing a reaction vessel and an analyzer with a pipette tip leading end detection device according to one embodiment of the present invention applied thereto.

A pipette tip leading end detection device X and a pipette tip leading end detection program according to the present embodiment are used when the leading end point of a pipette tip is detected without contact, for example, with respect to the bottom surface of an accommodation part 21 of a reaction vessel 2 shown in FIG. 1. The reaction vessel 2 schematically shown in FIG. 1 includes the accommodation part 21 (well) capable of accommodating liquid, and the liquid is injected into or removed from the accommodation part 21 through the leading end of a pipette tip 31 inserted from an upper opening of the accommodation part 21. A bottom surface 22 of the accommodation part 21 is a flat surface. Note that a micro-plate which is one type of reaction vessel is one in which a plurality of such wells are formed in a matrix on a common substrate.

A sample including a substance to be analyzed and a reaction reagent including a substance that causes an antigen-antibody reaction with the substance to be analyzed are separately injected into the accommodation part 21 of the reaction vessel 2. After the separate injection processing, information on presence or absence of an agglutination reaction generated in the reaction vessel 2 can be acquired by appropriate means, and analysis of components of the sample can be performed using the acquired data.

An analyzer 1 includes at least a liquid transfer unit 3 that supplies and discharges the liquid to/from the accommodation part 21 of the reaction vessel 2, and a control unit 4 that controls operation of the liquid transfer unit 3, as shown in FIG. 1. The liquid transfer unit 3 includes a pipette nozzle 32 whose leading end the pipette tip 31 is attached to, a pump 33 connected to the pipette nozzle 32, and a nozzle driver 34 that moves the pipette nozzle 32 up and down. Note that other units included in the analyzer 1 other than the liquid transfer unit 3 and control unit 4 are omitted in FIG. 1.

The pump 33 includes a syringe 331 and a plunger 332 capable of reciprocating in the syringe 331, and the plunger 332 is caused to reciprocate by a pump drive unit (not shown) including a drive motor (for example, a stepping motor). By causing the plunger 332 to reciprocate in the state where such a plunger pump 33 is connected to the pipette nozzle 32 via, for example, a pipe 35, processing in which external liquid is sucked into the pipette tip 31 or liquid in the pipette tip 31 is discharged outside can be quantitatively performed. The liquid in the accommodation part 21 can be also stirred by repeating the suction and discharge of the liquid. A liquid transfer amount and liquid transfer speed of the pipette tip 31 can be managed by driving the pump 33 with the stepping motor, and a remaining liquid quantity in the accommodation part 21 of the reaction vessel 2 can be also managed.

The nozzle driver 34 freely moves the pipette nozzle 32 in an axial direction (vertical direction in the embodiment) with, for example, a solenoid actuator or stepping motor.

The sample can be discharged and injected into the accommodation part 21 of the reaction vessel 2 or the liquid can be sucked and removed from the accommodation part 21 by the liquid transfer unit 3 including such a pipette nozzle 32, pump 33, and nozzle driver 34.

The pipette tip leading end detection device X according to the embodiment includes the above-described pipette nozzle 32, pump 33, and nozzle driver 34, and also includes a pressure sensor 36 that detects a pressure (pipette tip-pump pressure) generated between the pipette tip 31 and pump 33, and the control unit 4 that controls operations of the pump 33 and nozzle driver 34.

The pressure sensor 36 detects a pressure of a flow path from a leading end 311 of the pipette tip 31 into the pump 33 when air is sucked or discharged from the leading end 311 of the pipette tip 31. In the embodiment, a stable holding state of the pressure sensor 36 is ensured by providing a sensor attachment part on the syringe 331 of the pump 33 and attaching the pressure sensor 36 onto the sensor attachment part. The pressure sensor 36 is not particularly limited as long as it can measure the pipette tip-pump pressure. Examples of the pressure sensor 36 include a mechanical sensor using a Bourdon tube and an electronic sensor using a semiconductor or the like. Note that the analyzer 1 of the embodiment is configured to also detect clogging by the pressure sensor 36 at the time of sampling liquid by the liquid transfer unit 3 (during sucking processing and during discharging processing). That is, the pressure sensor 36 is originally provided in the analyzer 1 as a component constituting a part of the liquid transfer unit 3 in the same manner as the pipette nozzle 32, pump 33, and nozzle driver 34.

The control unit 4 is composed of, for example, a known computer or microcomputer including a calculation device, a control device, a storage device, an input device, an output device, and the like, and controls operations of the units of the analyzer 1 including the liquid transfer unit 3 according to predetermined programs. The control unit 4 in the embodiment includes a determination value calculation unit 41 and a leading end detection unit 42 in order to detect the leading end position of the pipette tip 31 with respect to the bottom surface 22 of the accommodation part 21 which is a reference surface set to the reaction vessel 2.

The determination value calculation unit 41 obtains a determination value using an AD conversion value which is a value obtained by A/D converting the pipette tip-pump pressure detected by the pressure sensor 36 while the pipette nozzle 32 is being lowered towards the bottom surface 22 of the accommodation part 21 by the nozzle driver 34 and air is being discharged or sucked from the leading end 311 of the pipette tip 31 by the pump 33. Here, the determination value is a calculation value indicating the speed of change in pressure calculated using a plurality of AD conversion values within a past certain time including the latest AD conversion value among AD conversion values of the pipette tip-pump pressure detected every certain time. In the embodiment, it is set to obtain the determination value using an AD conversion value of the pipette tip-pump pressure detected while the pipette nozzle 32 is being lowered and air is being discharged by the pump 33.

The determination value calculation unit 41 in the embodiment obtains a determination value DE by the following arithmetic expression, where P[n] denotes an AD conversion value of the pipette tip-pump pressure which is a value of the pressure sensor 36 read every 4 msec.

$$DE=(P[n-6]-P[n])\times 3+(P[n-5]-P[n-1])\times 2+(P[n-4]-P[n-2])$$

Expression 1 where "n" denotes a measurement order, the latest AD conversion value is indicated as P[n−0], that is, P[n], an AD conversion value before the latest AD conversion value by one point is indicated as P[n−1], and an AD conversion value before the latest AD conversion value by six points is indicated as P[n−6].

In this way, the determination value DE obtained by the above-described Expression 1 using the plurality of AD conversion values within the past certain time including the latest AD conversion value is a value reflecting an integration effect in differentiation, and a value indicating the speed and change amount of a pressure change in a period from the latest pressure detection time point to six points before.

As the number of AD conversion values used when obtaining the determination value DE is larger, that is, as the number of past AD conversion values going back from the latest AD conversion value is larger, more stable differentiation is reflected on the determination value DE while a response delay occurs by the increase of the number of past AD conversion values going back, and it is considered that there is a risk that the leading end 311 of the pipette tip 31 may contact with the bottom surface 22 of the accommodation part 21, i.e. the reference surface while the determination value DE is being obtained.

When the pipette tip leading end detection processing is performed, determination value calculation processing by the determination value calculation unit 41 is not performed during 150 msec from starting monitoring pressure change by lowering the pipette nozzle 32 after starting pump operation. That is, because a pressure generated by resistance in the opening of the pipette tip leading end 311 and in the pipe 35 connecting the pipette nozzle 32 and pump 33 after starting pump operation is read by the pressure sensor 36 during the first 100 msec or so after starting monitoring, the determination value calculation processing by the determination value calculation unit 41 is set to be performed after allowing for time for such pressure to stabilize.

The leading end detection unit 42 detects that the leading end 311 of the pipette tip 31 is close to but not in contact with the bottom surface 22 of the accommodation part 21, i.e. the reference surface on the basis that the determination value obtained by the determination value calculation unit 41 is equal to or greater than a preset threshold value. Here, the threshold value is a value larger than a maximum value of noise included in the determination value which occurs in the course of moving the pipette tip 31 towards the bottom surface 22 of the accommodation part 21. In the embodiment, the threshold value is stored in a predetermined memory (for example, an EEPROM; Electrically Erasable Programmable Read-Only Memory) as TE. The leading end detection unit 42 then determines the leading end 311 of the pipette tip 31 if a relationship between the determination value DE obtained by the determination value calculation unit 41 and the threshold value TE stored in the memory in advance is DE≥TE.

Then, when the determination value DE gets equal to or greater than the determination threshold value TE, the control unit 4 stops lowering operation of the pipette nozzle 32 by the nozzle driver 34, and also stops air discharging operation (pump operation) by the pump 33.

If the relationship between the determination value DE and threshold value TE does not satisfy the condition of DE≥TE, the control unit 4 in the embodiment continues the lowering operation of the pipette nozzle 32 by the nozzle driver 34, and also continues the pump operation and sets an AD conversion value at the next detection point (pressure detection point by the pressure sensor 36) as the latest AD conversion value to obtain the determination value DE by the above-described Expression 1 using the plurality of AD conversion values within the past certain time including the latest AD conversion value, determines whether the relationship between the determination value DE and threshold value TE is DE≥TE, and repeats the processes.

Figure 2:
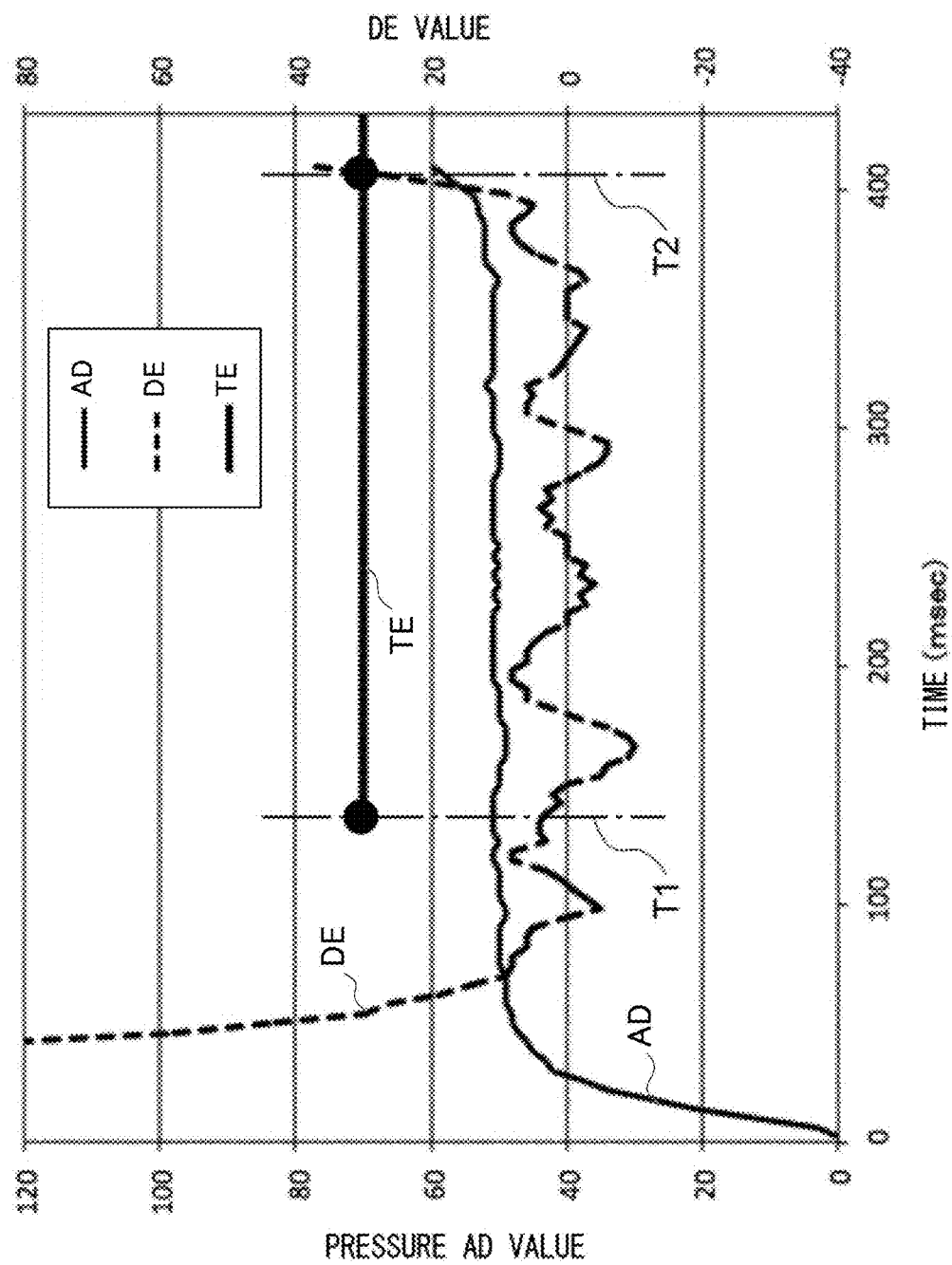
FIG. 2 is a diagram (graph) showing changes in pressure AD value and determination value during pipette tip leading end detection processing in the same embodiment.

FIG. 2 shows changes in the AD conversion value of the pipette tip-pump pressure detected every certain time and the determination value DE in relation to a time axis in which a pump operation start time point is set to 0 msec, by lowering the pipette nozzle 32 so as to approach the bottom surface 22 of the accommodation part 21, i.e. the reference surface while air is being discharged by the pump 33. In the figure, for convenience of explanation, the pressure 0 and AD conversion value 0 are made to coincide and a sign of the AD conversion value is reversed. In the figure, the AD conversion value and determination value DE are represented as pressure AD value and DE value, respectively.

As can be understood from FIG. 2, the AD conversion value changes rapidly in the first 100 msec or so after pump operation start and fluctuation of the determination value DE is large accordingly. This is a change due to a pressure generated by resistance in the opening of the pipette tip leading end 311 and in the pipe 35 connecting the pipette nozzle 32 and pump 33 as described before. The leading end detection determination processing by the leading end detection unit 42 is performed after allowing for time for such pressure to stabilize. The figure shows the threshold value TE in a time zone after a leading end detection determination start time T1. Specifically, leading end detection determination is started in the elapse of 136 msec after the pump operation start. Note that the lowering operation of the pipette nozzle 32 is started at almost the same time as the pump operation, but it is started setting as an original point (initialization position) a height position taking into consideration a free running distance until pressure stabilizes.

The determination value DE is repeatedly obtained until the relationship between the determination value DE and threshold value TE is DE≥TE, and the obtained determination value DE is sequentially compared with the threshold value TE.

In the pipette tip leading end detection processing shown in FIG. 2, the determination value DE obtained by the above-described Expression 1 becomes equal to or greater than the threshold value TE at a time point T2 of 408 msec after the pump operation start. On the basis of this determination result, it is detected that the leading end 311 of the pipette tip 31 is not in contact with the bottom surface 22 of the accommodation part 21, i.e. the reference surface and has reached a targeted proximity position.

As shown in FIG. 2, it can be confirmed that the waveform of the determination value DE swings up and down greatly in a time zone after the leading end detection processing start time T1 and before the time point T2 when the determination value DE becomes equal to or greater than the determination threshold value TE. This is what pneumatic or electric noise included in the determination value DE appears as a waveform in the course of moving the leading end 311 of the pipette tip 31 towards the bottom surface 22 of the accommodation part 21. In such a time point when the determination value DE largely fluctuates due to the noise of the pressure signal, although the leading end 311 of the pipette tip 31 is not in contact with the bottom surface 22 of the accommodation part 21, i.e. the reference surface, it has not reached the targeted proximity position less than a predetermined distance from the bottom surface 22 of the accommodation part 21. Therefore, if the lowering operation of the pipette nozzle 32 is stopped on the basis of the large waveform change of the determination value DE due to the noise, the leading end 311 of the pipette tip 31 has not reached the targeted proximity position.

Consequently, in the embodiment, the threshold value TE is set to a value larger than a maximum value of noise included in the determination value DE which occurs in the course of moving the leading end 311 of the pipette tip 31 towards the bottom surface 22 of the accommodation part 21. Specifically, the threshold value TE is set to a value 1.5 to 2 times the noise maximum value included in the determination value DE. As shown in FIG. 2, in the embodiment, the threshold value TE is set to 30.

In order to appropriately perform the leading end detection of the pipette tip 31, the relationship between the lowering speed of the pipette nozzle 32 and the discharge speed (discharge flow rate) of the pump 33 is important. Therefore, the inventor of the present invention stopped, every 7.5 µm pitch with respect to the reference surface, the pipette nozzle 32 whose leading end the pipette tip 31 is attached to, changed the pump discharge speed at each stop position, and measured the pipette tip-pump pressure. The measured results are shown in FIG. 3.

Figure 3:
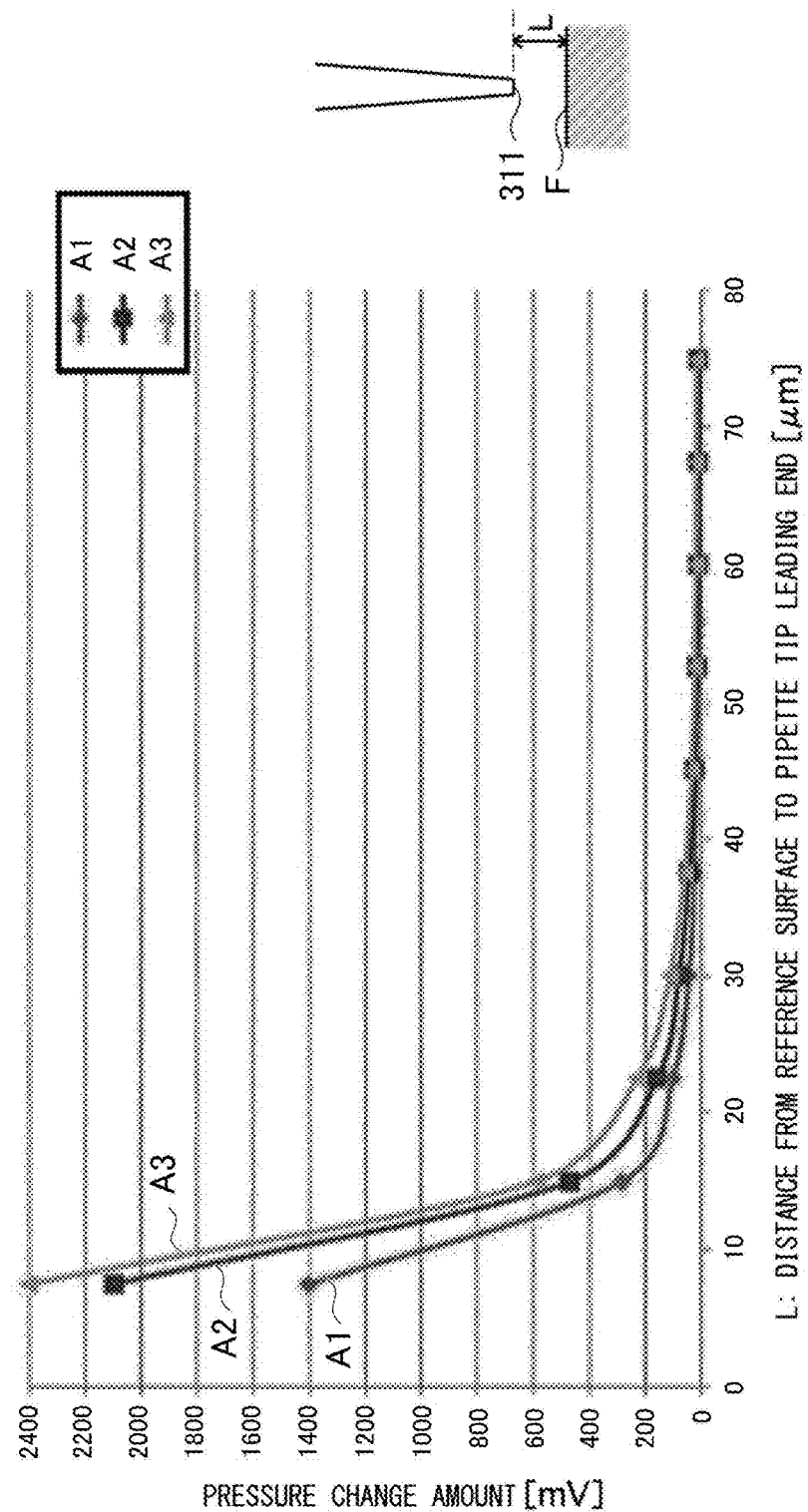
FIG. 3 is a diagram (graph) showing results of a static test conducted by the inventor of the present invention.

FIG. 3 indicates a difference with an initial value (subtraction) as a pressure change amount, and shows the measurement results when the pump discharge speeds are 100 µL/s (=500 pps), 150 µL/s (=750 pps), and 200 µL/s (=1000 pps) by circle marks (A1), square marks (A2), and triangle marks (A3), respectively. By the verification test (static test), it has been found that the pressure change amount when a distance L of the pipette tip leading end 311 from a reference surface F is sequentially changed to 7.5 µm, 15 µm, 22.5 µm, and 30 µm is significantly larger than the pressure change amount when the distance from the reference surface F is sequentially changed to 30 µm, 37.5 µm, and 45 µm in any of the above-described pump discharge speeds, especially the pressure change amount is larger as the distance from the reference surface F is closer, and the pressure change amount is larger as the pump discharge speed is faster. In addition, at any of the above-described pump discharge speeds, the pressure change amount was nearly zero when the distance from the reference surface F is sequentially changed to 52.5 µm and 60 µm, and the pressure change amount was zero when the distance from the reference surface F is sequentially changed to 67.5 µm and 75 µm.

By such a static test, it has been found that, under the condition that the pipette nozzle 32 is stopped when the pressure is measured, at any of the above-described pump discharge speeds, a relatively large pressure change occurs in the state where the leading end 31 of the pipette tip 31 is in proximity at a distance shorter than 100 µm from the reference surface, especially within 30 µm, and it is possible to detect the leading end position of the pipette tip 31 with respect to the reference surface from such a pressure change.

Figure 4:
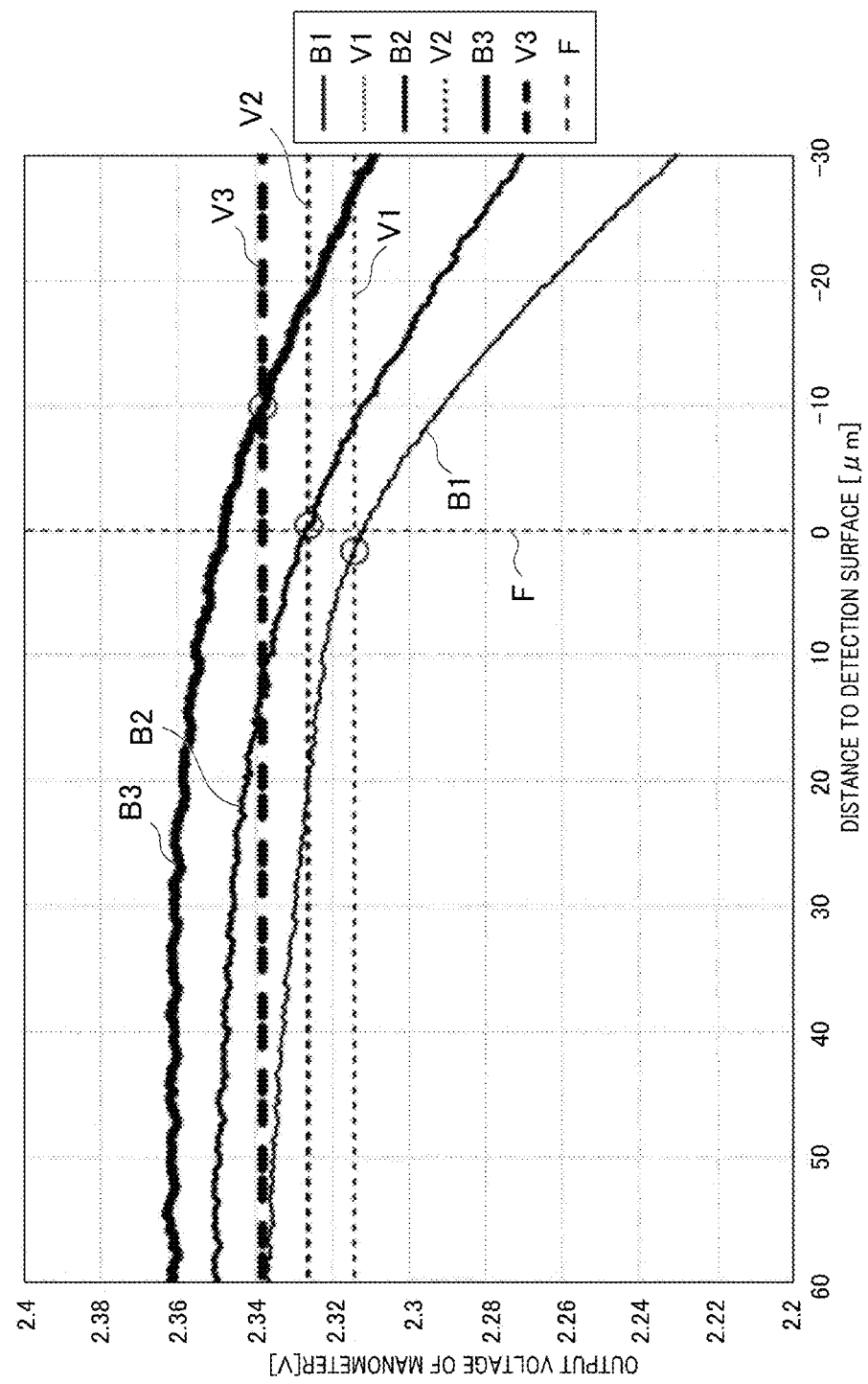
FIG. 4 is a diagram (graph) showing results of a dynamic test conducted by the inventor.

Next, the inventor conducted a test (dynamic test) that detects the leading end 311 of the pipette tip 31 in the state where the leading end 311 of the pipette tip 31 is at a distance shorter than 100 µm from the reference surface, especially within 30 µm, and is not in contact with the reference surface, and verifies combinations of the lowering speeds of the pipette nozzle 32 and the pump discharge speeds allowing the pipette nozzle 32 being lowered at the predetermined speed until then to be stopped before contacting with the reference surface on the basis of the detection information. FIG. 4 shows results of the dynamic test when the lowering speed of the pipette nozzle 32 is set to 2.625 mm/s (=350 pps), whereas FIG. 5 does when the lowering speed of the pipette nozzle 32 is set to 1.875 mm/s (=250 pps) and FIG. 6 does when the lowering speed of the pipette nozzle 32 is set to 1.125 mm/s (=150 pps).

Figure 5:
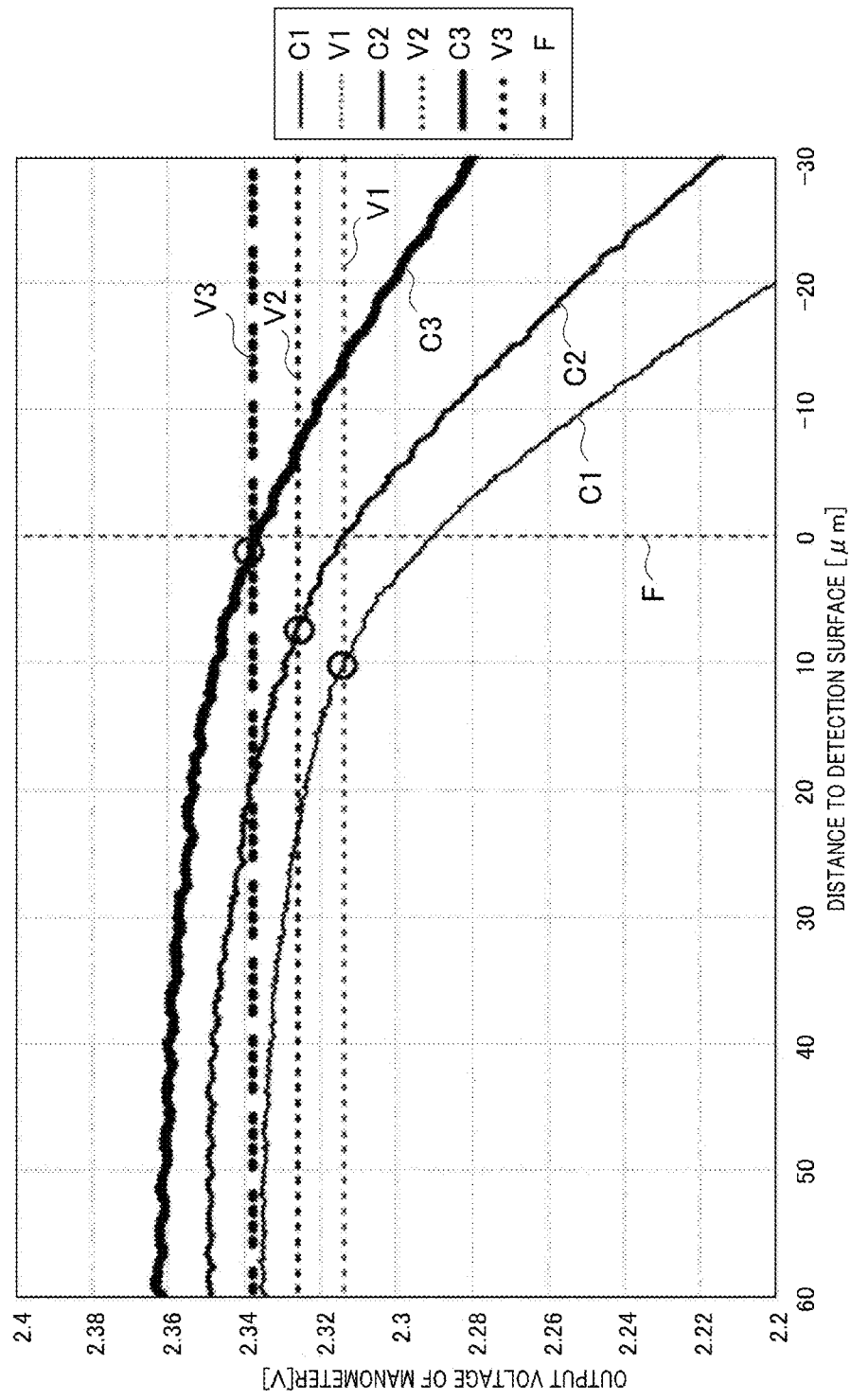
FIG. 5 is a diagram (graph) showing results of a dynamic test conducted by the inventor.
Figure 6:
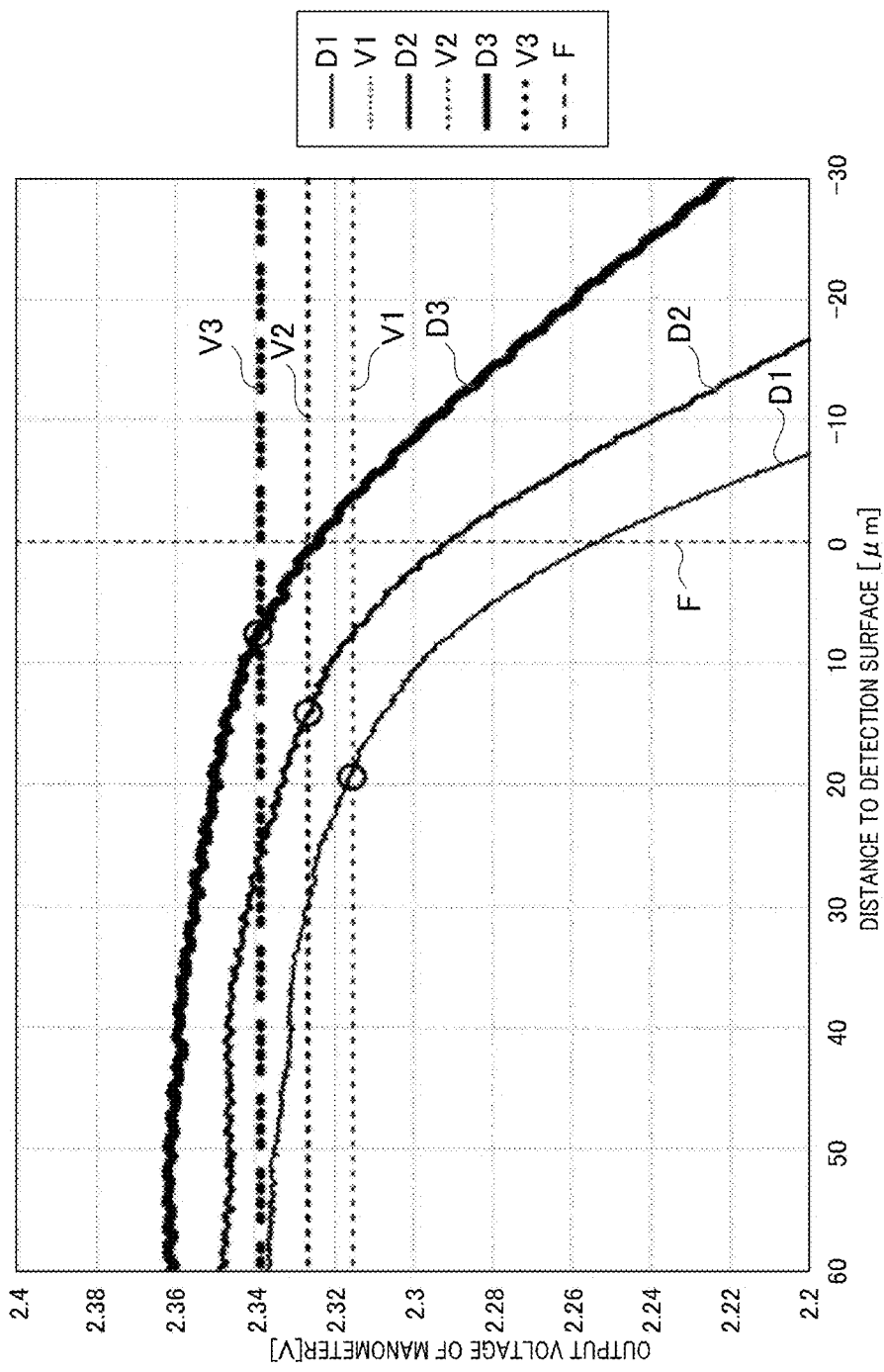
FIG. 6 is a diagram (graph) showing results of a dynamic test conducted by the inventor.

In FIG. 4-FIG. 6, the vertical axis indicates the pipette tip-pump pressure (output voltage of a manometer) [V] and the horizontal axis indicates the distance L [µm] of the pipette tip leading end 311 to the reference surface (detection surface) F. In the Figures, V1, V2, and V3 represent prescribed threshold values (25 mV) of the pipette tip-pump pressure with respect to the pump discharge speeds 400 µL/s (=2000 pps), 300 µL/s (=1500 pps), and 200 µL/s (=1000 pps), respectively, and F in the figures represents the reference surface (detection surface).

As shown in FIG. 4, when the lowering speed of the pipette nozzle 32 is 2.625 mm/s (=350 pps), if the pump discharge speed is 200 µL/s (=1000 pps) indicated by B3 in the figure, or 300 µL/s (=1500 pps) indicated by B2 in the figure, at a point indicated by a circle mark in the figure, that is, a point where the pipette tip-pump pressure (output voltage of the manometer) becomes smaller than the predetermined threshold value, the distance to the reference surface (detection surface) F is too short and there is no margin, and if the pump discharge speed is 400 µL/s (=2000 pps) indicated by B1 in the figure, the leading end 311 of the pipette tip 31 collides with the reference surface F before stopping the lowering operation of the pipette nozzle 32. Note that the test results were obtained by using a principle confirmation model, and the object to be detected has a structure which escapes after contact on the condition of being softly fixed. Therefore, behavior until the distance to the reference surface (detection surface) F is minus (in reality, it is in a state of collision and further sticking) is captured.

In contrast, as shown in FIG. 5, when the lowering speed of the pipette nozzle 32 is 1.875 mm/s (=250 pps), if the pump discharge speed is 200 µL/s (=1000 pps) indicated by C3 in the figure, the distance to the reference surface F is too short and there is a risk that the leading end 311 of the pipette tip 31 may collide with the reference surface F at a time point before stopping the lowering operation of the pipette nozzle 32, whereas if the pump discharge speed is 300 µL/s (=1500 pps) indicated by C2 in the figure or 400 µL/s (=2000 pps) indicated by C1 in the figure, it was able to detect that the leading end 311 of the pipette tip 31 is in the proximity state without contacting with the reference surface F and stop the lowering operation of the pipette nozzle 32 at a time point before the leading end 311 of the pipette tip 31 contacts with the reference surface F.

Furthermore, as shown in FIG. 6, when the lowering speed of the pipette nozzle 32 is 1.125 mm/s (=150 pps), even if the pump discharge speed is any of 200 µL/s (=1000 pps) indicated by D3 in the figure, 300 µL/s (=1500 pps) indicated by D2 in the figure, and 400 µL/s (=2000 pps) indicated by D1 in the figure, it was able to detect being in the proximity state without contacting with the reference surface F and stop the lowering operation of the pipette nozzle 32 at a time point before the leading end 311 of the pipette tip 31 contacts with the reference surface F.

From the above, it is found that if the pump discharge speed is in the same condition, by setting the lowering speed of the pipette nozzle 32 slower, it is possible to detect that the leading end 311 of the pipette tip 31 is close to but not in contact with the reference surface and stop the lowering operation of the pipette nozzle 32 before the leading end 311 of the pipette tip 31 contacts with the reference surface, and it is also possible to avoid the situation in which the leading end 311 of the pipette tip 31 collides with the reference surface, or the distance from the leading end 311 of the pipette tip 31 to the reference surface at the time point of stopping the lowering operation of the pipette nozzle 32 is too short and there is almost no margin. On the other hand, it has also become clear that if the pump discharge speed is in the same condition, as the lowering speed of the pipette nozzle 32 is set slower, the distance from the leading end of the pipette nozzle 32 detected and stopped to the reference surface becomes longer, and the time required for the pipette tip leading end detection processing becomes longer.

In the combinations of the lowering speeds of the pipette nozzle 32 and the pump discharge speeds at which the distance from the leading end 311 of the pipette tip 31 detected and stopped to the reference surface is not too short and the leading end 311 of the pipette tip 31 does not contact with the reference surface, it is also found that if the nozzle lowering speed is in the same condition, as the pump discharge speed is set faster, the distance from the leading end of the pipette nozzle 32 detected and stopped to the reference surface becomes longer.

Therefore, the inventor has discovered that it is possible to firstly determine a lowering speed of the pipette nozzle 32 suitable for the processing speed required for the pipette tip leading end detection processing (nozzle speed determination condition), and at the lowering speed of the pipette nozzle 32, to determine a pump discharge speed at which a situation is avoided in which the leading end 311 of the pipette tip 31 collides with the reference surface or the distance to the reference surface is too short and there is almost no margin, and at which the leading end of the pipette nozzle 32 detected and stopped is close to but not in contact with the reference surface (pump operation speed determination condition), and thereby to select a combination of the lowering speed of the pipette nozzle 32 and the pump discharge speed allowing for appropriate execution of the pipette tip leading end detection processing.

The pipette tip leading end detection processing that has caused the pressure change shown in FIG. 2 is one example in which it selects 1.875 mm/s (=250 pps) as a lowering speed of the pipette nozzle 32 suitable for a processing speed required for the leading end detection processing on the basis of the dynamic test results shown in FIG. 4-FIG. 6, and at the selected lowering speed, selects the pump discharge speed 300 μL/s (=1500 pps) at which the leading end of the pipette nozzle 32 detected and stopped is closest to but not in contact with the reference surface among pump discharge speeds at which the situation can be avoided in which the leading end 311 of the pipette tip 31 collides with the reference surface or the distance to the reference surface is too short and there is almost no margin. In this way, in the embodiment, it is set to select the optimum combination of the lowering speed of the pipette nozzle 32 and pump discharge speed depending on the above-described nozzle speed determination condition and pump operation speed condition and to perform the above-described pipette tip leading end detection processing while controlling operations of the nozzle driver 34 and pump 33 by the control unit 4 so as to achieve the selected lowering speed of the pipette nozzle 32 and pump discharge speed.

As a result of performing multiple times of the pipette tip leading end detection processing for each pipette nozzle 32 using a plurality of pipette nozzles 32 on the basis of the combination of the lowering speed of the pipette nozzle 32 and pump discharge speed selected depending on the nozzle speed determination condition and pump operation speed condition, it was proved to be able to detect stably as the distance between the leading end 311 of the pipette tip 31 stopped and the reference surface fell within the range of 5-20 μm at all the times of end of the pipette tip leading end detection processing, showing high repeatability.

As described above, the pipette tip leading end detection device X according to the embodiment is applied to the analyzer 1, built using components and parts originally provided in the analyzer 1, and can monitor the pipette tip-pump pressure detected by the pressure sensor 36 while air is being discharged from the leading end 311 of the pipette tip 31 by the pump 33 at almost the same time as lowering of the pipette nozzle 32, and detect the bottom surface 22 of the accommodation part 21, i.e. the reference surface from the pressure change. Specifically, the pipette tip leading end detection device X according to the present invention is configured to obtain the determination value DE indicating the speed of change in pressure calculated using a plurality of AD conversion values in the past certain time including the latest AD conversion value among AD conversion values of the pipette tip-pump pressure detected every certain time, compare the determination value DE with the threshold value TE which is a value larger than the maximum value of noise included in the determination value DE which occurs in the course of moving the leading end 311 of the pipette tip 31 towards the bottom surface 22 of the accommodation part 21, and detect that the leading end 311 of the pipette tip 31 is in the proximity state where the leading end 311 of the pipette tip 31 is not in contact with the bottom surface 22 of the accommodation part 21, i.e. the reference surface and is within the predetermined distance from the bottom surface 22 on the basis that the determination value DE is equal to or greater than the preset threshold value TE.

As described above, according to the pipette tip leading end detection device X according to the present embodiment, an impact of the noise included in the determination value DE which occurs in the course of moving the leading end 311 of the pipette tip 31 towards the bottom surface 22 of the accommodation part 21 can be removed, a situation of erroneously detecting being in the proximity state and stopping in the state of not reaching the targeted proximity state is avoided, the state in which the leading end 311 of the pipette tip 31 is fully brought close to the bottom surface 22 of the accommodation part 21 within the range of not affecting the supply and discharge processing of liquid through the leading end 311 of the pipette tip 31 can be detected and stopped, and thereby the pipette tip leading end detection processing with high in accuracy and excellent in repeatability can be achieved.

Figure 7:
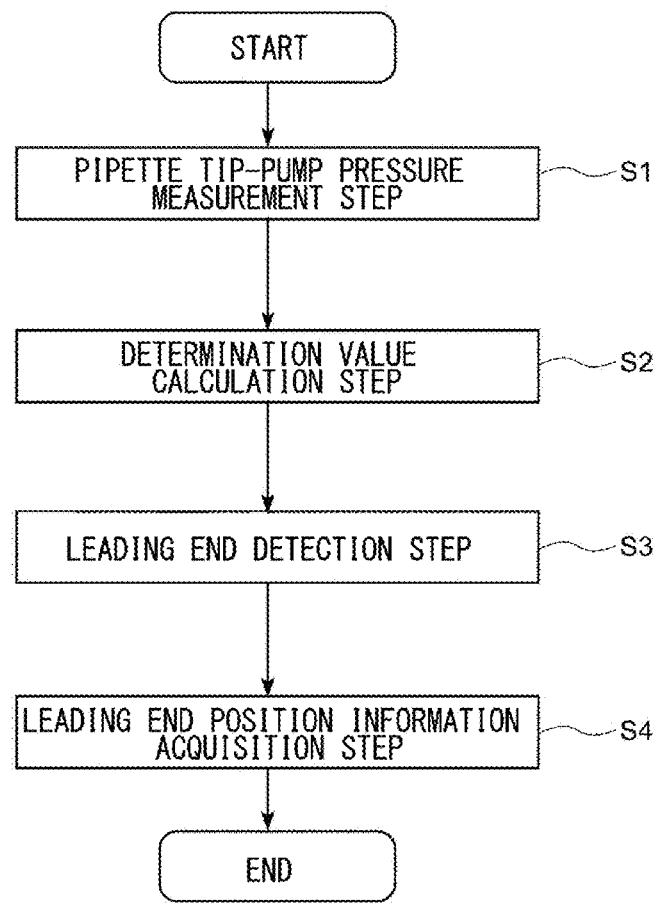
FIG. 7 is a flowchart of the pipette tip leading end detection processing in the same embodiment.

Next, the procedure of pipette leading end detection processing in the embodiment will be described with reference to FIG. 7. The pipette leading end detection processing is performed as preprocessing of the detection of a substance to be detected by the analyzer 1. When a measurement preprocessing command is received on the basis of an appropriate operation by an operator, the analyzer 1 of the embodiment executes the pipette tip leading end detection program according to the embodiment to operate the units as follows. Examples of the substance to be detected include nucleic acids (such as DNA and RNA), proteins (such as polypeptides and oligopeptides), amino acids, carbohydrates, lipids, and modified molecules thereof.

First, the control unit 4 drives the pump 33 to cause the plunger 332 to proceed with respect to the syringe 331 and measures the pipette tip-pump pressure by the pressure sensor 36 while moving the pipette nozzle 32 towards the bottom surface 22 of the accommodation part 21 from the original point (initialization position) set at a position immediately above the bottom surface 22 (reference surface) of the accommodation part 21 by the nozzle driver 34 and air is being discharged consecutively from the leading end 311 of the pipette tip 31 (pipette tip-pump pressure measurement step S1). Then, the control unit 4 obtains the determination value DE by the determination value calculation unit 41 using the AD conversion value of the pipette tip-pump pressure measured in the pipette tip-pump pressure measurement step S1 (determination value calculation step S2). In the determination value calculation step S2, the determination value DE is obtained by the above-described Expression 1.

Next, the control unit 4 determines whether the determination value DE obtained in the determination value calculation step S2 is equal to or greater than the preset threshold value TE, and on the basis that the determination value DE becomes equal to or greater than the preset threshold value TE, detects that the leading end 311 of the pipette tip 31 has reached the targeted proximity position without contacting with the bottom surface 22 of the accommodation part 21, i.e. the reference surface by the leading end detection unit 42 (leading end detection step S3). At this time, the pipette tip-pump pressure measurement step S1 and determination value calculation step S2 are repeated until the determination value DE obtained in the determination value calculation step S2 becomes equal to or greater than the predetermined threshold value TE.

When the leading end 311 of the pipette tip 31 is detected in the leading end detection step S3, the control unit 4 obtains the information on the leading end position of the pipette tip 31 detected in the leading end detection step S3 (leading end position information acquisition step S4). Specifically, the detected leading end position (detection position) of the pipette tip 31 is recorded in a predetermined record area as a distance (μm) from the original point.

Such pipette tip leading end detection processing is performed as "preprocessing" of processing of detecting the presence or quantity of the substance to be detected contained in the sample and detects the leading end position of the pipette tip 31 for each test. Then, the detected leading end position (detection position) of the pipette tip 31 is used for nozzle control in a test sequence thereafter, and thereby it is possible to control the quantity of the liquid in the accommodation part 21 with high accuracy.

Specifically, when the substance to be detected is detected (measured) by the analyzer 1, at the time of performing the following processing performed through the leading end 311 of the pipette tip 31, for example, processing of injecting the liquid from the leading end 311 of the pipette tip 31 into the accommodation part 21 or processing of removing the liquid in the accommodation part 21 from the accommodation part 21, by positioning and stopping the leading end 311 of the pipette tip 31 at the leading end position (detection position) of the pipette tip 31 detected in the pipette tip leading end detection processing, it is possible to control the quantity of the liquid in the accommodation part 21 with high accuracy. In particular, by sucking various types of liquid into the pipette tip 31 and thereby removing the various types of liquid from the accommodation part 21 in the state where the leading end 311 of the pipette tip 31 is positioned and stopped at the leading end position (detection position) of the pipette tip 31 detected in the pipette tip leading end detection processing, the liquid quantity remaining in the accommodation part 21 can be minimized, and the liquid quantity remaining in the accommodation part 21 can be made constant. In this manner, the liquid quantity remaining in the accommodation part 21 can be minimized and made constant, and thereby the accuracy of detection results (measurement results) of the substance to be detected by the analyzer 1 can be further improved than the prior art. Examples of the liquid include the sample containing the substance to be detected (for example, blood, serum, plasma, urine, nasal fluid, saliva, and semen), a labeling solution, and a washing solution.

In the embodiment, the bottom surface 22 of the accommodation part 21 to which stable high proximity accuracy is repeatedly requested is set as the reference surface, thereby the leading end position of the pipette tip 31 can be controlled with even higher accuracy than the prior art. Especially, when the bottom surface 2 of the accommodation part 21 is a reaction solid phase, the pipette tip leading end detection technique according to the embodiment capable of bringing the leading end 311 of the pipette tip 31 close to the maximum without contacting with such a reaction solid phase can provide a reaction field showing a stable reaction without causing damage to the reaction solid phase, and significantly contributes to the improvement of the analysis accuracy.

By repeating the reciprocation operation of the plunger 332 with respect to the syringe 331 in the state in which the leading end 311 of the pipette tip 31 is stopped in the accommodation part 21 in reaching the targeted proximity position but not in contact with the bottom surface 22 of the accommodation part 21, the liquid in the reaction vessel 2 is reciprocated in the accommodation part 21 and stirred. Thereby, homogenization of concentration of the liquid, promotion of reaction in the accommodation part 21, and the like can be achieved.

Note that the present invention is not limited to the above-described embodiment. For example, the determination value obtained by the determination value calculation unit may be a value calculated using the AD conversion values of the pipette tip-pump pressure detected every certain time longer or shorter than the above-described "4 msec" or may be a value calculated using the AD conversion values of the pipette tip-pump pressure detected consecutively.

The determination value works well as long as it is a calculation value indicating the speed of a change in pressure calculated using a plurality of AD conversion values in the past certain time including the latest AD conversion value among the AD conversion values of the pipette tip-pump pressure detected every certain time or consecutively (determination value condition) and may be a calculation value obtained by an expression other than the above-described Expression 1.

The threshold value works well as long as it is a value larger than the maximum value of noise included in the determination value which occurs in the course of moving the leading end of the pipette tip towards the reference surface (threshold value condition) and can be set to an appropriate value. The setting of the threshold value may be performed, for example, at the time of calibration or warming up of the analyzer.

The pump operation when the determination value is obtained may be the suction of air (negative pressure) instead of the discharge of air. In this case, although the pressure change during the leading end detection processing is a change that reverses the sign that appears when the pump operation is the discharge of air, by setting the determination value and threshold value to values satisfying the determination value condition and threshold value condition, respectively, it is possible to detect the leading end of the pipette tip that is close to but not in contact with the reference surface with high accuracy in the same manner as the pipette tip leading end detection processing of the embodiment.

When the leading end detection processing is performed, the suction or discharge of air at the leading end of the pipette tip based on the pump operation may be performed consecutively, or may be performed intermittently.

The inventor has found that, by using completely the same configuration as the pipette tip leading end detection device X and setting a liquid surface to the reference surface, it is possible to implement a liquid surface detection device that detects that the leading end 311 of the pipette tip 31 is close to but not in contact with the liquid surface, i.e. the reference surface. As the liquid surface which is the reference surface, the liquid surface of the liquid in the accommodation part 21 of the reaction vessel 2 and the like can be mentioned.

Figure 8:
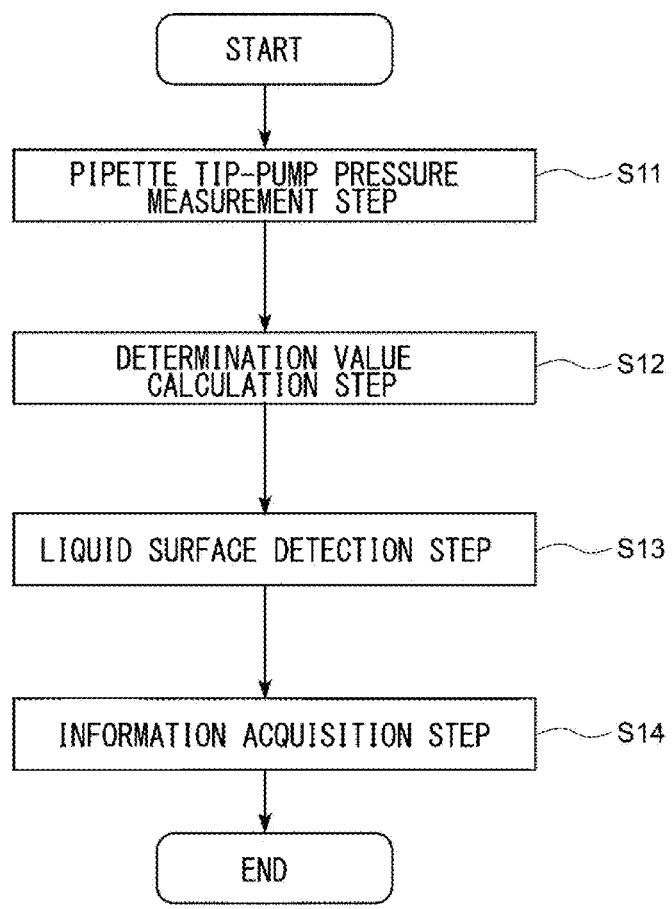
FIG. 8 is a flowchart of liquid surface detection processing in the same embodiment.

When a liquid surface detection program corresponding to the pipette tip leading end detection program is executed, the control unit 4 drives the pump 33 to cause the plunger 332 to proceed with respect to the syringe 331 and measures the pipette tip-pump pressure by the pressure sensor 36 while moving the pipette nozzle 32 towards the liquid surface by the nozzle driver 34 and air is being discharged consecutively from the leading end 311 of the pipette tip 31 (pipette tip-pump pressure measurement step S11: see FIG. 8). Then, the control unit 4 obtains a determination value DL by using the AD conversion values of the pipette tip-pump pressure measured in the pipette tip-pump pressure measurement step S11 (determination value calculation step S12). In the determination value calculation step S12, the determination value DL is obtained by changing DE in the above-described Expression 1 to DL.

Next, the control unit 4 determines whether the determination value DL obtained in the determination value calculation step S12 is equal to or greater than a preset threshold value TL, and on the basis that the determination value DL becomes equal to or greater than the preset threshold value TL, detects that the leading end 311 of the pipette tip 31 has reached the targeted proximity position without contacting with the liquid surface, i.e. the reference surface (liquid surface detection step S13). At this time, the pipette tip-pump pressure measurement step S11 and determination value calculation step S12 are repeated until the determination value DL obtained in the determination value calculation step S102 becomes equal to or greater than the predetermined threshold value TL. Note that the threshold value TL can be set to the same value as the above-described threshold value TE.

When the determination value DL becomes equal to or greater than the threshold value TL in the liquid surface detection step S13, the control unit 4 obtains the information detected in the liquid surface detection step S13 (information acquisition step S14). Specifically, the leading end position (detection position) of the pipette tip 31 when the determination value DL becomes equal to or greater than the threshold value TL in the liquid surface detection step S13 is recorded in a predetermined record area as a distance (μm) from the original point.

Although the liquid splashes or ripples occur from the liquid surface when measuring the pipette tip-pump pressure, the leading end position of the pipette tip 31 with respect to the liquid surface obtained through the above procedure is used in nozzle control in a test sequence thereafter, and thereby the distance between the leading end 311 of the pipette tip 31 and the liquid surface can be controlled with high accuracy.

The pipette tip leading end detection processing and liquid surface detection processing may be performed by recording the pipette tip leading end detection program and liquid surface detection program on a computer-readable recording medium, and causing a computer system to read the programs recorded on the recording medium and execute them. The "computer system" mentioned here may be one including an OS and hardware such as a peripheral device, and the "computer-readable recording medium" means a storage device like a rewritable non-volatile memory such as a flexible disk, a magneto-optical disk, a ROM or a flash memory, a portable medium such as a CD-ROM, a hard disk built in the computer system, or the like. Furthermore, the "computer-readable recording medium" includes one holding a program for a certain time like a volatile memory (for example, a DRAM (Dynamic Random Access Memory)) inside the computer system serving as a server or client when the program is transmitted through a network such as the Internet or a communication line such as a telephone line.

The program may be transmitted from a computer system that has stored the program in the storage device or the like to another computer system via a transmission medium or a transmission wave in the transmission medium. Here, the "transmission medium" for transmitting the program refers to a medium that has a function to transmit information, like a network (communication network) such as the Internet or a communication line (communication wire) such as a telephone line.

It is also possible to apply the pipette tip leading end detection device and pipette tip leading end detection program according to the present invention to an appropriate device other than the analyzer, for example, a dispensation device.

The "bottom surface of the accommodation part," i.e. the reference surface may be the bottom surface of an appropriate accommodation part other than the bottom surface of the above-described accommodation part 21 of the reaction vessel 2, for example, the bottom surface of a flow path (liquid flow path) through which liquid flows in a reaction chip. As the pump, a pump other than the plunger pump can be also applied.

In addition, the specific configuration of each unit is not limited to the above embodiment either, and various modifications can be made within a range not departing from the spirit of the present invention.

INDUSTRIAL APPLICABILITY

The present invention is applicable to a pipette tip leading end detection device and a pipette tip leading end detection program.

REFERENCE SIGNS LIST

2 Reaction vessel
21 Accommodation part
31 Pipette tip
32 Pipette nozzle
33 Pump
34 Nozzle driver
36 Pressure sensor
4 Control unit
41 Determination value calculation unit
42 Leading end detection unit
X Pipette tip leading end detection device

The invention claimed is:

1. A pipette tip leading end detection device for detecting that a leading end of a pipette tip attached to a pipette nozzle and sucking or discharging liquid is close to a reference surface set to a reaction vessel having an accommodation part capable of accommodating the liquid, comprising:
the pipette nozzle with the pipette tip attached thereto;
a pump connected to the pipette nozzle;
a nozzle driver that moves the pipette nozzle up and down,
a pressure sensor that detects a pipette tip-pump pressure generated between the pipette tip and the pump; and
a hardware processor that controls operations of at least the pump and the nozzle driver, wherein the hardware processor:

obtains a determination value using an AD conversion value which is a value obtained by A/D converting the pipette tip-pump pressure detected by the pressure sensor while the pipette nozzle is being lowered towards a bottom surface of the accommodation part by the nozzle driver and air is being discharged or sucked from the leading end of the pipette tip by the pump; and detects that the leading end of the pipette tip is close to but not in contact with the bottom surface of the accommodation part as the reference surface on the basis that the obtained determination value is equal to or greater than a preset threshold value, wherein:

the determination value is a calculation value indicating speed of a change in the pressure calculated by using a plurality of AD conversion values within a past certain time including a latest AD conversion value among AD conversion values of the pipette tip-pump pressure detected every certain time or consecutively; and the threshold value is a value larger than a maximum value of noise included in the determination value which occurs in the course of moving the leading end of the pipette tip towards the bottom surface of the accommodation part.

2. A non-transitory computer readable storage medium storing a pipette tip leading end detection program for causing a computer to detect a leading end of a pipette tip close to a reference surface, causing the computer to:

detect a pipette tip-pump pressure generated between a pump connected with a pipette nozzle and the pipette tip by a pressure sensor while the pipette nozzle with the pipette tip sucking or discharging liquid attached thereto is being lowered towards a bottom surface of an accommodation part of a reaction vessel having the accommodation part capable of accommodating the liquid and air is being discharged from the leading end of the pipette tip, and obtain a determination value using an AD conversion value which is a value obtained by A/D converting the detected pipette tip-pump pressure; and detect that the leading end of the pipette tip is close to the bottom surface of the accommodation part as the reference surface on the basis that the obtained determination value is equal to or greater than a preset threshold value, wherein:

the determination value is a calculation value indicating speed of a change in the pressure calculated by using a plurality of AD conversion values within a past certain time including a latest AD conversion value among AD conversion values of the pipette tip-pump pressure detected every certain time or consecutively; and the threshold value is a value larger than a maximum value of noise included in the determination value which occurs in the course of moving the leading end of the pipette tip towards the bottom surface of the accommodation part.

\* \* \* \* \*